US010780635B1

(12) United States Patent
Susnjara et al.

(10) Patent No.: US 10,780,635 B1
(45) Date of Patent: Sep. 22, 2020

(54) APPARATUS AND METHOD FOR THERMAL COMPENSATION DURING ADDITIVE MANUFACTURING

(71) Applicant: Thermwood Corporation, Dale, IN (US)

(72) Inventors: Kenneth J. Susnjara, Birdseye, IN (US); Brian S. Smiddy, Newburgh, IN (US); John Fuquay, Boonville, IN (US); Scott G. Vaal, Jasper, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 16/596,089

(22) Filed: Oct. 8, 2019

(51) Int. Cl.
| | |
|---|---|
| *B29C 64/209* | (2017.01) |
| *B29C 64/25* | (2017.01) |
| *B29C 64/118* | (2017.01) |
| *B29C 64/227* | (2017.01) |
| *B29C 64/205* | (2017.01) |
| *B29C 64/232* | (2017.01) |
| *B33Y 30/00* | (2015.01) |
| *B33Y 10/00* | (2015.01) |

(52) U.S. Cl.
CPC .......... *B29C 64/209* (2017.08); *B29C 64/118* (2017.08); *B29C 64/205* (2017.08); *B29C 64/227* (2017.08); *B29C 64/232* (2017.08); *B29C 64/25* (2017.08); *B33Y 10/00* (2014.12); *B33Y 30/00* (2014.12)

(58) Field of Classification Search
CPC ..... B29C 64/209; B29C 64/25; B29C 64/227; B29C 64/118; B33Y 30/00; B33Y 10/00
See application file for complete search history.

(56) References Cited

U.S. PATENT DOCUMENTS

| | | | | | |
|---|---|---|---|---|---|
| 3,849,051 | A | * | 11/1974 | Solbeck | B32B 27/12 425/377 |
| 4,840,077 | A | * | 6/1989 | Katahira | B08B 15/00 74/441 |
| 5,456,118 | A | * | 10/1995 | Hines | B29C 43/04 73/818 |
| 5,462,426 | A | * | 10/1995 | Imamura | B29C 48/265 425/190 |
| 5,581,467 | A | * | 12/1996 | Yasuda | G05B 19/404 700/193 |
| 5,865,472 | A | * | 2/1999 | Freynhofer | F16L 27/087 285/41 |

(Continued)

FOREIGN PATENT DOCUMENTS

| | | | |
|---|---|---|---|
| JP | 62182136 | * | 8/1987 |
| KR | 1802087 | * | 11/2017 |

OTHER PUBLICATIONS

Sloan, "Big additive machines tackle large molds," CompositesWorld, Jun. 11, 2019. (8 pages).

*Primary Examiner* — Jeffrey M Wollschlager
(74) *Attorney, Agent, or Firm* — Bookoff McAndrews, PLLC

(57) ABSTRACT

An additive manufacturing apparatus includes an extruder and a gear pump in fluid communication with extruder. The additive manufacturing apparatus also includes a nozzle in fluid communication with the gear pump. The extruder is connected to a guide member such that at least a portion of the extruder is configured to expand and move along the guide member according to a thermal expansion of the extruder.

16 Claims, 8 Drawing Sheets

(56) References Cited

U.S. PATENT DOCUMENTS

| | | | |
|---|---|---|---|
| 6,344,086 B1* | 2/2002 | Okada | B29C 48/30 |
| | | | 118/125 |
| 6,749,414 B1* | 6/2004 | Hanson | B33Y 30/00 |
| | | | 425/130 |
| 7,731,816 B2 | 6/2010 | Oldani et al. | |
| 7,810,539 B2 | 10/2010 | Mischler et al. | |
| 8,151,854 B2 | 4/2012 | Oldani | |
| 8,534,338 B2 | 9/2013 | Oldani et al. | |
| 8,954,180 B2 | 2/2015 | Oldani | |
| 2005/0178225 A1* | 8/2005 | Erikson | F16H 25/2409 |
| | | | 74/89.42 |
| 2005/0231383 A1* | 10/2005 | Pratt | G01V 11/002 |
| | | | 340/855.4 |
| 2007/0044899 A1 | 3/2007 | Tingley | |
| 2008/0006017 A1 | 1/2008 | Rindels | |
| 2010/0200168 A1 | 8/2010 | Oldani et al. | |
| 2011/0316191 A1* | 12/2011 | Di Simone | B29C 45/1603 |
| | | | 264/255 |
| 2016/0059481 A1* | 3/2016 | Starodubtsev | B29C 48/255 |
| | | | 264/494 |
| 2016/0236409 A1* | 8/2016 | Armani | G05B 19/402 |
| 2016/0288424 A1* | 10/2016 | Susnjara | B29C 64/255 |
| 2017/0008230 A1* | 1/2017 | Yuyama | B33Y 30/00 |
| 2017/0066873 A1* | 3/2017 | Gardet | C08G 63/16 |
| 2017/0190118 A1* | 7/2017 | Mire | B29C 48/92 |
| 2017/0259482 A1* | 9/2017 | Contractor | B29C 48/02 |
| 2018/0050502 A1 | 2/2018 | Oldani | |
| 2018/0111306 A1* | 4/2018 | Mandel | B29C 48/92 |
| 2018/0133980 A1* | 5/2018 | Mantell | B29C 48/345 |
| 2018/0222124 A1* | 8/2018 | Susnjara | B29C 70/546 |
| 2018/0281171 A1* | 10/2018 | Rajendra Zanpure | |
| | | | B33Y 80/00 |
| 2018/0304517 A1* | 10/2018 | Veariel | B29B 7/24 |
| 2019/0077081 A1* | 3/2019 | Susnjara | B29C 64/106 |

\* cited by examiner

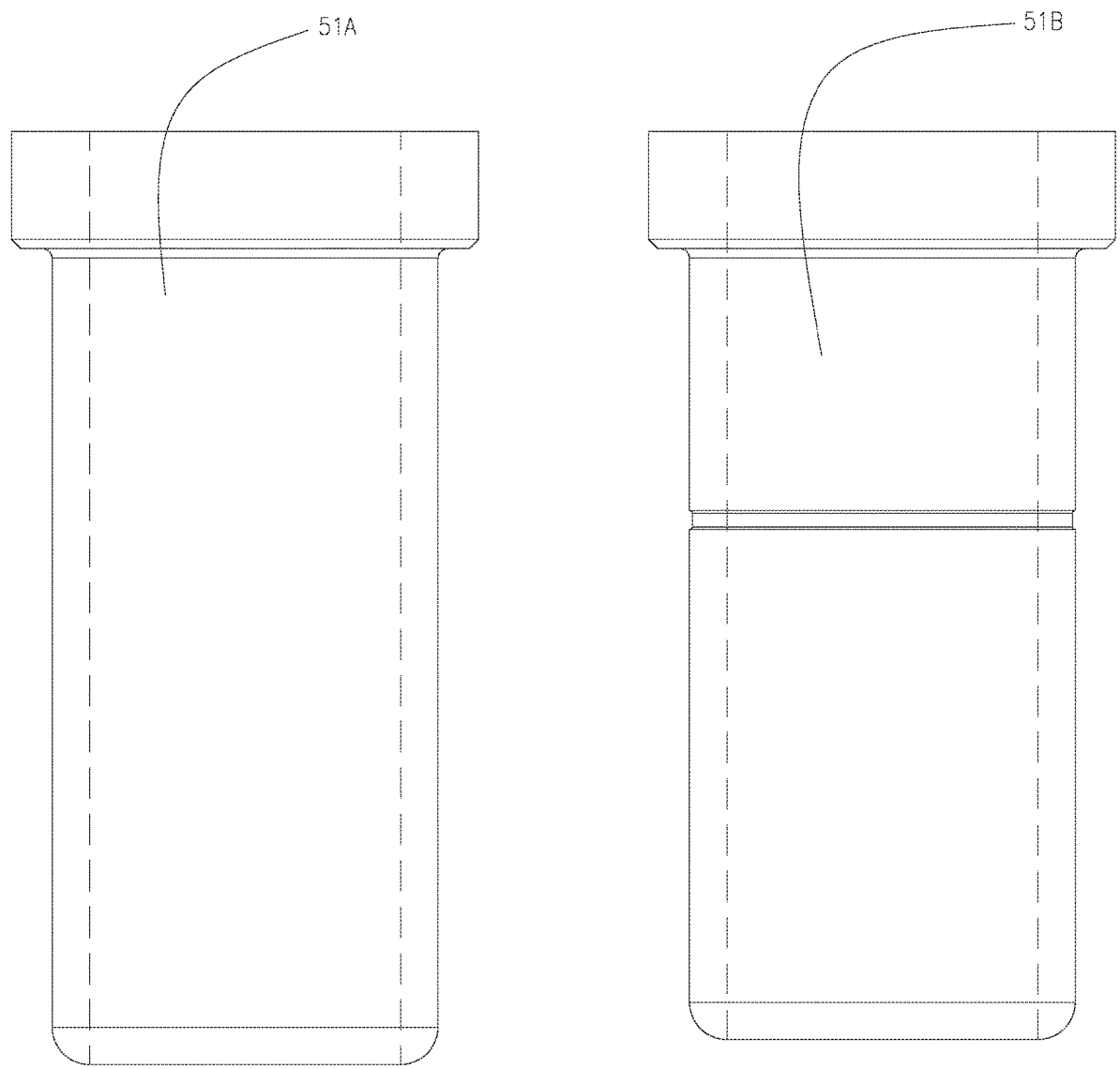
Fig. 7

APPARATUS AND METHOD FOR THERMAL COMPENSATION DURING ADDITIVE MANUFACTURING

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., 3D printing manufacturing techniques or processes.

BACKGROUND

Additive manufacturing techniques and processes generally involve the buildup of one or more materials to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including, e.g., freeform fabrication, 3D printing, rapid prototyping/tooling, etc. Additive manufacturing techniques may be used to fabricate simple or complex components from a wide variety of materials. For example, a freestanding object may be fabricated from a computer-aided design (CAD) model.

A particular type of additive manufacturing is commonly known as 3D printing. One such process, commonly referred to as Fused Deposition Modeling (FDM) or Fused Layer Modeling (FLM) comprises a process of melting a thin layer of thermoplastic material, and applying this material in layers to produce a final part. This is commonly accomplished by passing a continuous thin filament of thermoplastic material through a heated nozzle, which melts the material and applies it to the structure being printed. The heated material may be applied to the existing structure in thin layers, melting and fusing with the existing material to produce a solid finished product.

The filament used in the aforementioned process may be produced by, for example, using a plastic extruder, which may include a steel extruder screw configured to rotate inside of a heated steel barrel. Thermoplastic material in the form of small pellets may be introduced into one end of the rotating screw. Friction from the rotating screw, combined with heat from the barrel may soften the plastic, which may then be forced under pressure through a small round opening in a die that is attached to the front of the extruder barrel. This extrudes a string of material which is cooled and coiled up for use in the 3D printer.

Melting a thin filament of material in order to 3D print an item may be a very slow process, which may be suitable for producing relatively small items or a limited number of items. The melted filament approach to 3D printing may be too slow to manufacture large items. However, the fundamental process of 3D printing using molten thermoplastic materials may offer advantages for the manufacture of larger parts or a larger number of items.

In some instances, the process of 3D printing a part may involve a two-step process. For example, the process may utilize a large print bead to achieve an accurate final size and shape. This two-step process, commonly referred to as near-net-shape, may begin by printing a part to a size slightly larger than needed, then machining, milling, or routing the part to the final size and shape. The additional time required to trim the part to final size may be compensated for by the faster printing process.

Print heads for additive manufacturing machines used to print thermoplastic material in relatively large beads have generally included a vertically-mounted extruder connected to a print nozzle to deposit the bead of material onto a surface and/or a part being printed. These traditional print heads may include an oscillating plate surrounding the nozzle, the plate being configured to oscillate vertically to flatten the bead of material against the surface or part on which the bead is deposited.

The aforementioned traditional print heads may have several drawbacks. For example, the height of the print nozzle with respect to the carrier may change along on a z-axis due to the thermal expansion or contraction of one or more components of the print head in such traditional print heads. This potential drawback may be due to the vertical extruder being rigidly mounted to the carrier. As the extruder heats up, it may expand along the Z-axis. Similarly, expansion may cause the nozzle to move in position with respect to the carrier in a direction along the z-axis. When materials having different temperatures (e.g., due to different melting points) are printed, the nozzle may move to different heights, therefore the nozzle height may not be at the same height for each print. These issues may introduce difficulties when creating programs for printing as the location of the nozzle may be dependent on the thermal expansion and/or contraction of the extruder, which may be sufficiently large to affect the printing process.

SUMMARY

Aspects of the present disclosure relate to, among other things, methods and apparatus for fabricating components via additive manufacturing or 3D printing techniques. Each of the aspects disclosed herein may include one or more of the features described in connection with any of the other disclosed aspects. An exemplary object of the present disclosure is to control thermal expansion and/or contraction of a print head so a height of a nozzle may remain at a fixed height with respect to the carrier in a z-direction (vertical direction). In one aspect, an additive manufacturing apparatus such as a computer numerical control (CNC) machine may include a melt pump mounted to the carrier to hold the nozzle in a an approximately fixed position while an expansion assembly including, for example, the extruder, feed housing, transition housing, gearbox, and servomotor, may grow and/or shrink in the vertical direction in accordance with the thermal expansion and/or contraction. In one aspect, movement of one or more components of the expansion assembly may be facilitated by a set of linear bearings and rails attached to the expansion assembly via the transition housing. Thus, as the extruder and other components heat up and grow in length, the bearings may move up the rails via the linear bearings. The gear pump may be mounted to the carrier so the gear pump may be secured at a fixed position relative to the carrier. In one aspect, the thermal expansion of these components does not affect the position of the gear pump or the nozzle. For example, a position of the nozzle may only by affected by its own thermal expansion. Such thermal expansion of the nozzle may be addressed by using different length nozzle tips.

In one aspect, an additive manufacturing apparatus may include an extruder and a gear pump in fluid communication with the extruder, the gear pump supported on the additive manufacturing apparatus with the extruder. The additive manufacturing apparatus may also include a nozzle in fluid communication with the gear pump. The extruder may be movably connected to a guide member such that at least a portion of the extruder is configured to expand and move with respect to the guide member according to a thermal expansion of the extruder.

In another aspect, an additive manufacturing apparatus may include an extruder supported on a support member and a gear pump fluidly coupled to the extruder. The additive manufacturing apparatus may also include a nozzle in fluid communication with the gear pump and movable along an x-axis, a y-axis, and a z-axis to deposit a bead of thermoplastic material. The extruder may be connected to a linear motion assembly on the support member configured to raise and lower the extruder along the z-axis.

In another aspect, a method for thermal compensation during additive manufacturing may include raising a temperature of an extruder from room temperature to an operating temperature and melting a thermoplastic material with a heat generated by at least one of an extruder and a plurality of heaters provided on the extruder. The method may also include receiving the melted thermoplastic material with a gear pump downstream of the extruder, and allowing the extruder to expand relative to the nozzle due to an expansion of the extruder while raising the temperature of the extruder.

In another aspect of the present disclosure, a print head may be configured to compensate for the thermal expansion and/or contraction. For example, a lead screw (e.g., ball screw or acme screw) mechanism may be configured to raise and lower the transition housing and the components attached thereto. For example, a lead screw (such as an acme screw) mechanism may be configured to move within a top support bearing. As the extruder expands upward linearly, it may lift the lead screw. In one aspect, the lead screw may be configured to slide upward in the top support bearing (e.g., by providing a lead screw with a reduced length). When the extruder cools down and contracts the lead screw may slide downward in the top support bearing. Therefore, the extruder, feed housing, transition housing, gearbox, and servomotor may be configured to grow and shrink in a vertical direction in accordance with the thermal expansion of the components without the lead screw mechanism constricting this motion.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

FIG. 7 is an enlarged front view of an exemplary low and high temperature nozzle tips;

DETAILED DESCRIPTION

Figure 1:
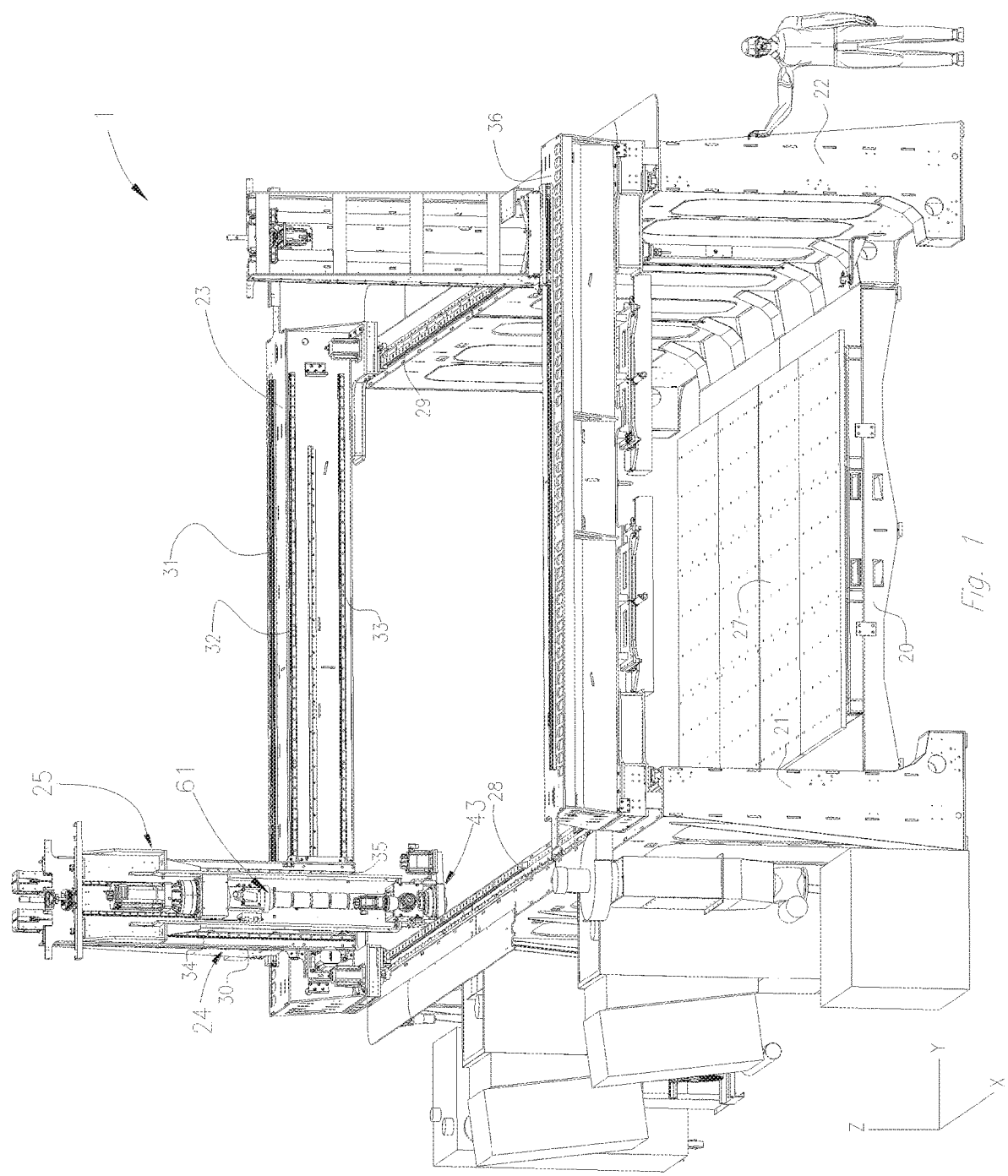
FIG. 1 is a perspective view of an exemplary CNC machine operable pursuant to an additive manufacturing process to form articles or parts, according to an aspect of the present disclosure.

The present disclosure is drawn to, among other things, methods and apparatus for fabricating multiple components via additive manufacturing or 3D printing techniques. Specifically, the methods and apparatus may include a print head configured to control thermal expansion or contraction of the print head, which is configured to maintain a fixed or constant nozzle height with respect to a carrier (e.g., in a direction parallel to a z-axis). With reference to FIG. 1, an additive manufacturing apparatus such as a computer numerical control (CNC) machine 1 may include a bed 20 provided with a pair of transversely spaced side walls 21 and 22, a printing gantry 23 supported on side walls 21 and 22, and a trimming gantry 36 supported on side walls 21 and 22. CNC machine 1 may also include a carriage 24 mounted on printing gantry 23, a support member or carrier 25 mounted on carriage 24, an extruder 61 mounted on carrier 25, and an applicator assembly or applicator head 43 mounted on carrier 25. Carrier 25 may be formed by one or more plates that form a support structure for extruder 61 and applicator head 43. A horizontal worktable 27 may be supported on bed 20 between side walls 21 and 22. Horizontal worktable 27 may include a support surface disposed in an x-y plane. Printing gantry 23 and trimming gantry 36 may each be disposed so as to extend along a y-axis, and may each be supported by side walls 21 and 22. Printing gantry 23 and trimming gantry 36 may be fixedly supported with respect to an x-axis by a set of guide rails 28 and 29 provided on the upper ends of side walls 21 and 22. The printing gantry 23 and trimming gantry 36 may be displaceable by a set of servomotors mounted on the printing gantry 23 and trimming gantry 36 and operatively connected to tracks provided on the side walls 21 and 22 of the bed 20. Carriage 24 may be supported on printing gantry 23 and provided with a support member 30 mounted on and displaceable along one or more guide rails, such as guide rails 31, 32, and 33, which may be provided on the printing gantry 23. Carriage 24 may be displaceable along the y-axis via guide rails 31, 32, and 33 by a servomotor mounted on the printing gantry 23 and operatively connected to support member 30. Carrier 25 may be mounted on a set of spaced, vertically-extending guide rails 34 and 35 supported on the carriage 24 for displacement of the carrier 25 relative to the carriage 24 along a z-axis. Carrier 25 may be displaceable along the z-axis by a servomotor mounted on the carriage 24 and operatively connected to the carrier 25.

Figure 2:
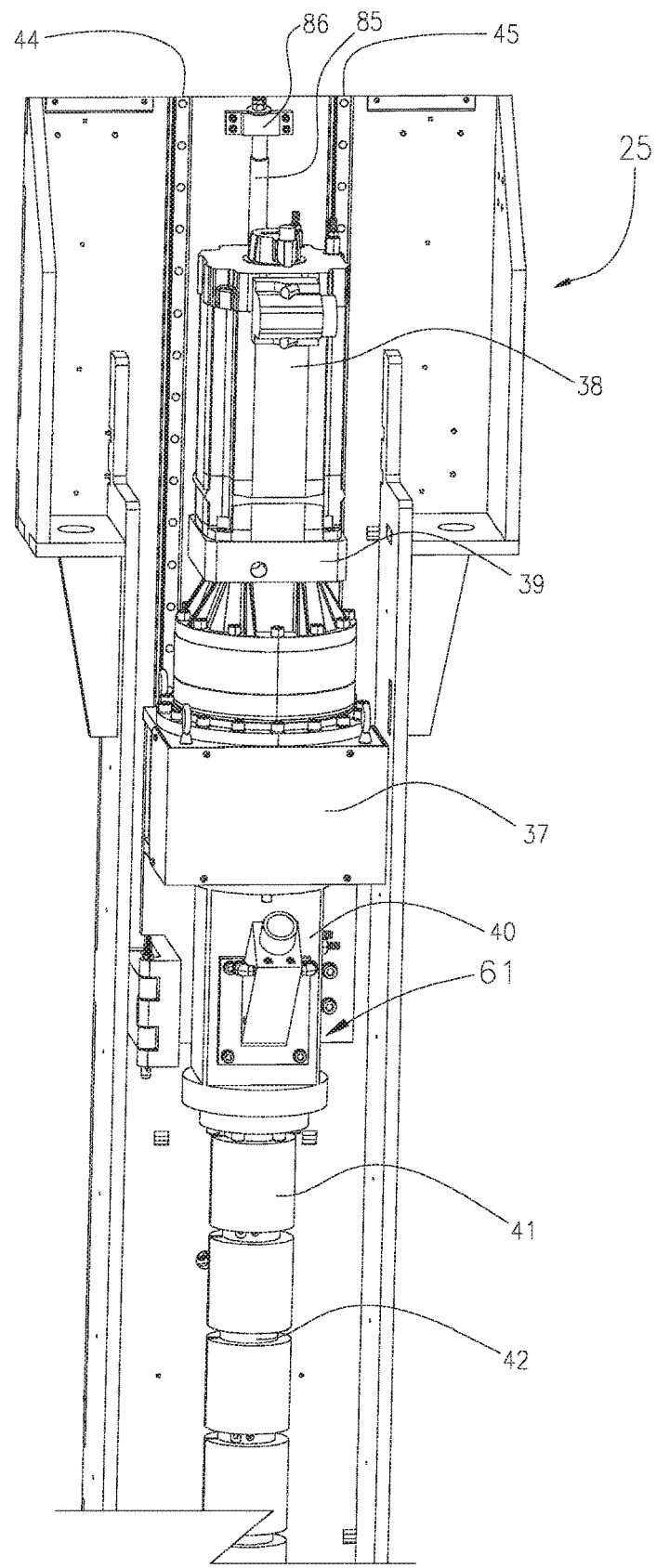
FIG. 2 is a perspective view of an exemplary carrier and extruder assembly of the exemplary CNC machine shown in FIG. 1.

As shown in FIG. 2, extruder 61 may be movably mounted to carrier 25 via a pair of guide members or rails 44 and 45. Extruder 61 may be connected to rails 44 and 45 by one or more bushings (see bearing 50 in FIG. 5). Extruder 61 may be driven by a servomotor 38 and a gearbox 39, which may be attached to transition housing 37. In an exemplary embodiment, lead screw 85, support bearing 86, and nut 87 (described below), may form an exemplary linear motion assembly. This linear motion assembly may also include rails 44 and 45. Extruder 61 may receive thermoplastic pellets through a feed housing 40. The thermoplastic pellets may be transferred, via an extruder screw, through the barrel 42 where the pellets may be melted by the friction of the screw and/or heat generated by heaters 41. Extruder 61 may then cause molten thermoplastic material to flow to a gear pump 62 fluidly coupled to extruder 61 (FIG. 3).

Figure 3:
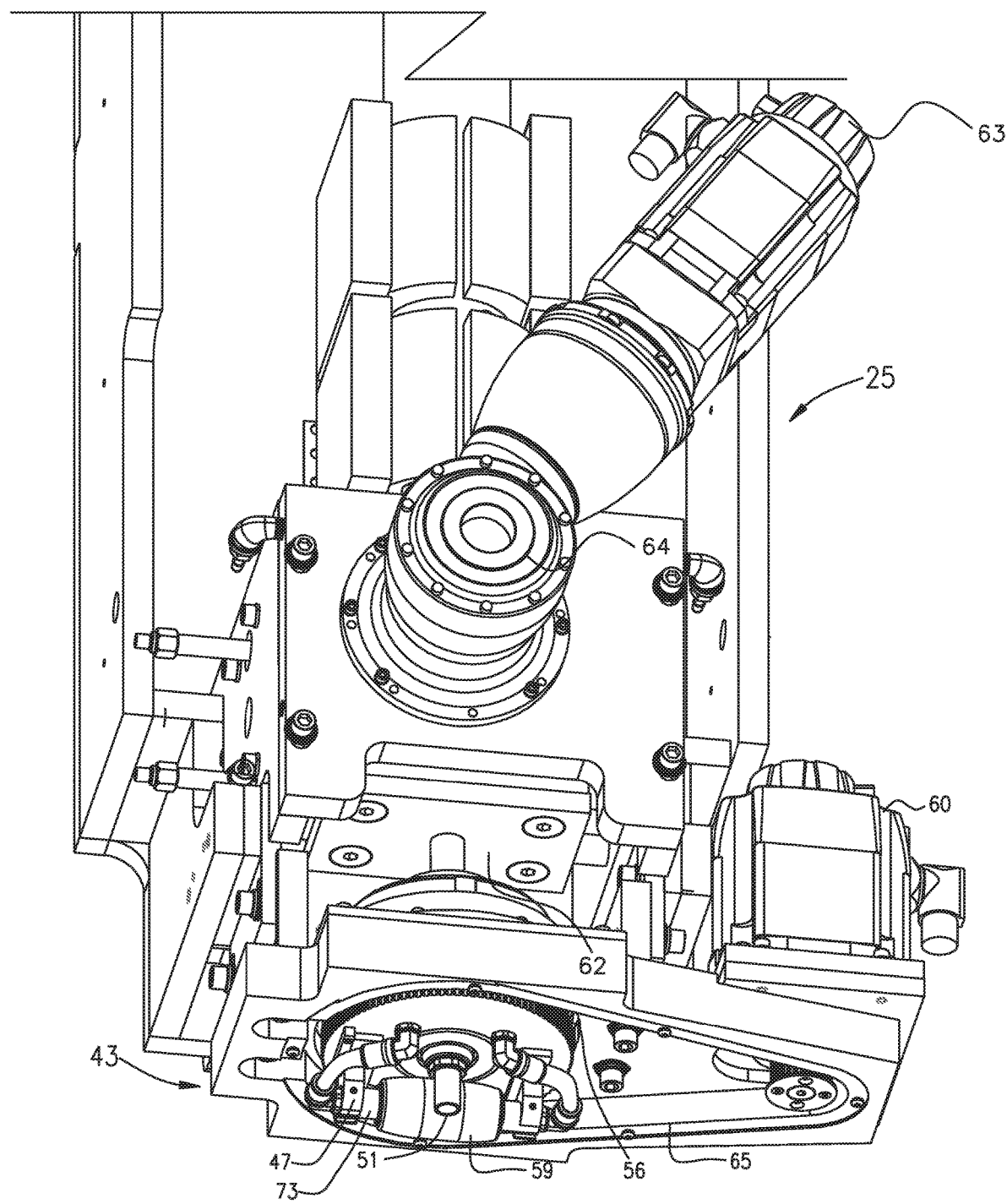
FIG. 3 is an enlarged perspective view of an exemplary carrier and applicator assembly of the exemplary CNC machine shown in FIG. 1.

As shown in FIG. 3, a gear pump (or melt pump) 62 may be fixedly mounted to the bottom of carrier 25 and may be supported on CNC machine 1 with extruder 61 via carrier 25. In an exemplary configuration, gear pump 62 may be a positive displacement gear pump driven by a servomotor 63 through a gearbox 64. Gear pump 62 may receive molten thermoplastic from extruder 61 (FIG. 2), and meter out precise amounts of the molten thermoplastic material at predetermined flow rates to nozzle 51 to print the part by moving the nozzle along the x-axis, y-axis, and z-axis. The extruder 61 and gear pump 62 together may provide the ability to utilize extruder screw configurations which may cause uneven flow in configurations where only an extruder is provided. In one aspect, the melt pump may act to even out material flow and provide increased design freedom for the extrusion screw.

A bead shaping roller 59, rotationally mounted in carrier bracket 47, may provide a means for flattening and leveling an oversized bead of fluid material (e.g., molten thermoplastic material) extruded by the nozzle 51. Carrier bracket 47 may be adapted to be rotationally displaced by a servomotor 60. For example, servomotor 60 may be operably connected to carrier bracket 47 by a pulley 56 and belt 65.

Figure 4:
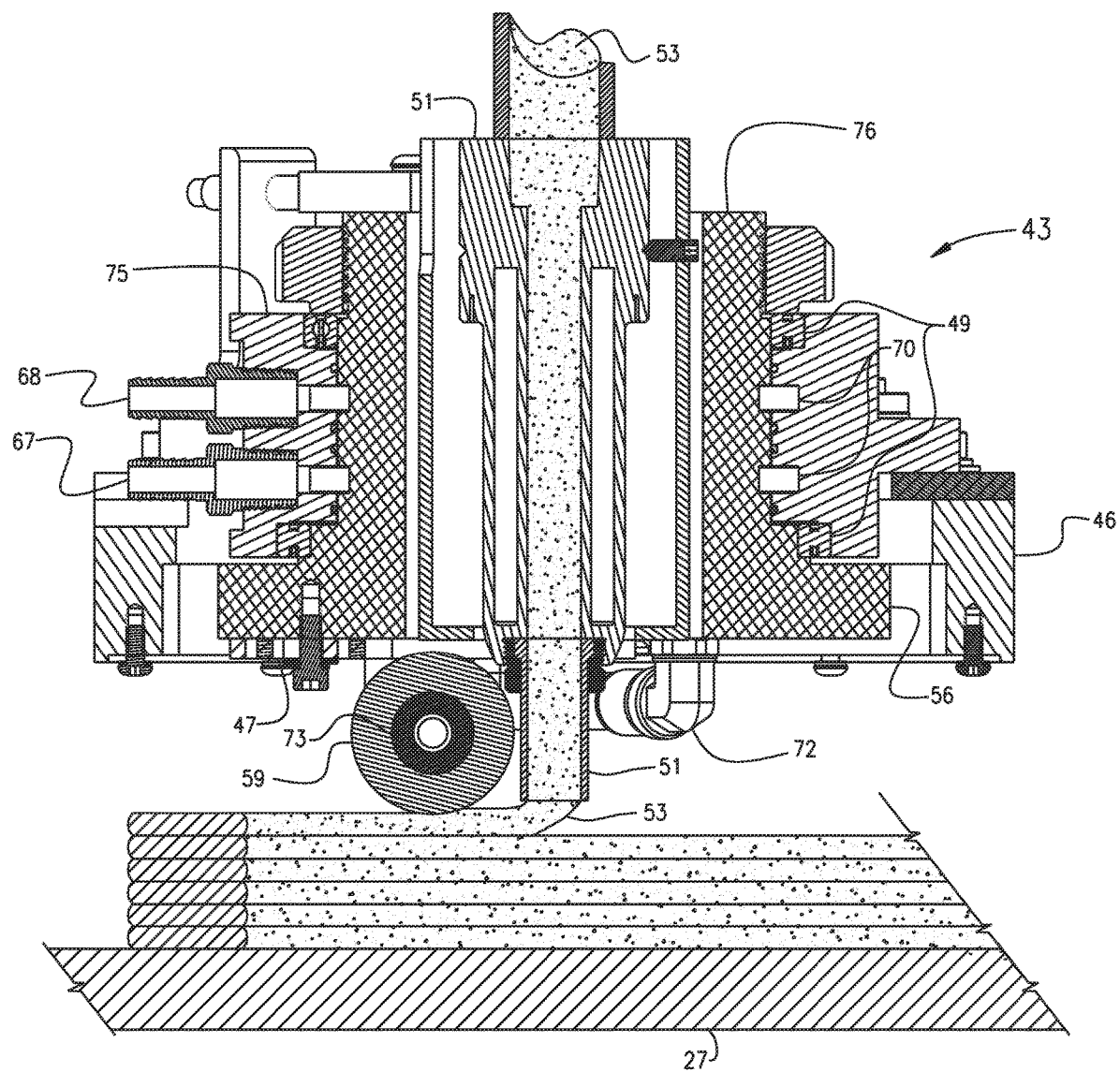
FIG. 4 is an enlarged cutaway view of an exemplary applicator assembly shown in FIG. 3.

With reference to FIG. 4, applicator head 43 may include a housing 46 with a rotary union mounted therein. Pulley 56 may be machined into an inner hub 76 of the rotary union. The inner hub 76 may have an opening with a diameter sized to receive the heated print nozzle 51. The inner hub 76 may rotate on a set of bearings 49 provided in an outer housing 75 of the rotary union. The compression roller assembly may be attached to the inner hub 76 of the rotary union so that the compression roller 59 rotates about the print nozzle 51. The rotary union may also contain barb fittings 67 and 68 in fluid communication with coolant passages 70. In one aspect, coolant passages 70 may surround the inner hub 76 and the inside of the outer housing 75 of the rotary union. The coolant passages 70 continue through quick disconnect fittings 72 into the axle 73 of the compression roller 59.

As shown in FIGS. 3 and 4, for example, an oversized bead of flowable material (e.g., molten thermoplastic) may be provided under pressure from a source disposed on carrier 25 (e.g., gear pump 62) or another source, to applicator head 43. This material may be provided to a nozzle 51 in communication with applicator head 43, which may be fixedly connected to carrier 25. In use, the flowable material 53 (e.g., thermoplastic material) may be heated sufficiently to form a molten bead, which is then extruded through applicator nozzle 51 to form substantially uniform, smooth rows of deposited material on a surface of worktable 27. Such beads of molten material may be flattened, leveled, and/or or fused to adjoining layers with substantially no trapped air by bead-shaping compression roller 59 with the layers forming 3D printed products.

Figure 5:
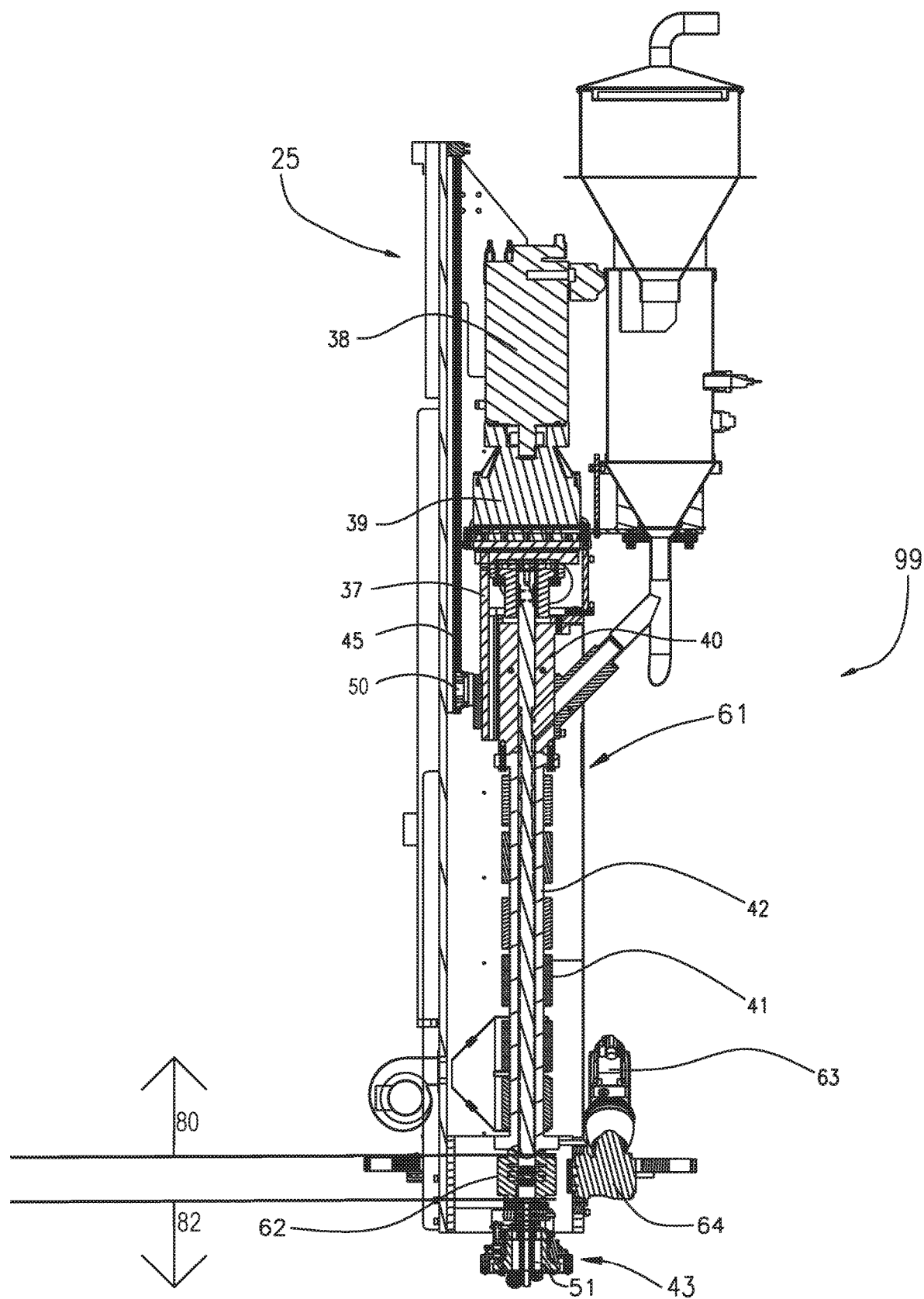
FIG. 5 is a cross-section view of an exemplary high output print head assembly of the exemplary CNC machine shown in FIG. 1 from a first side at a position of a rail and linear bearing of the CNC machine.
Figure 6:
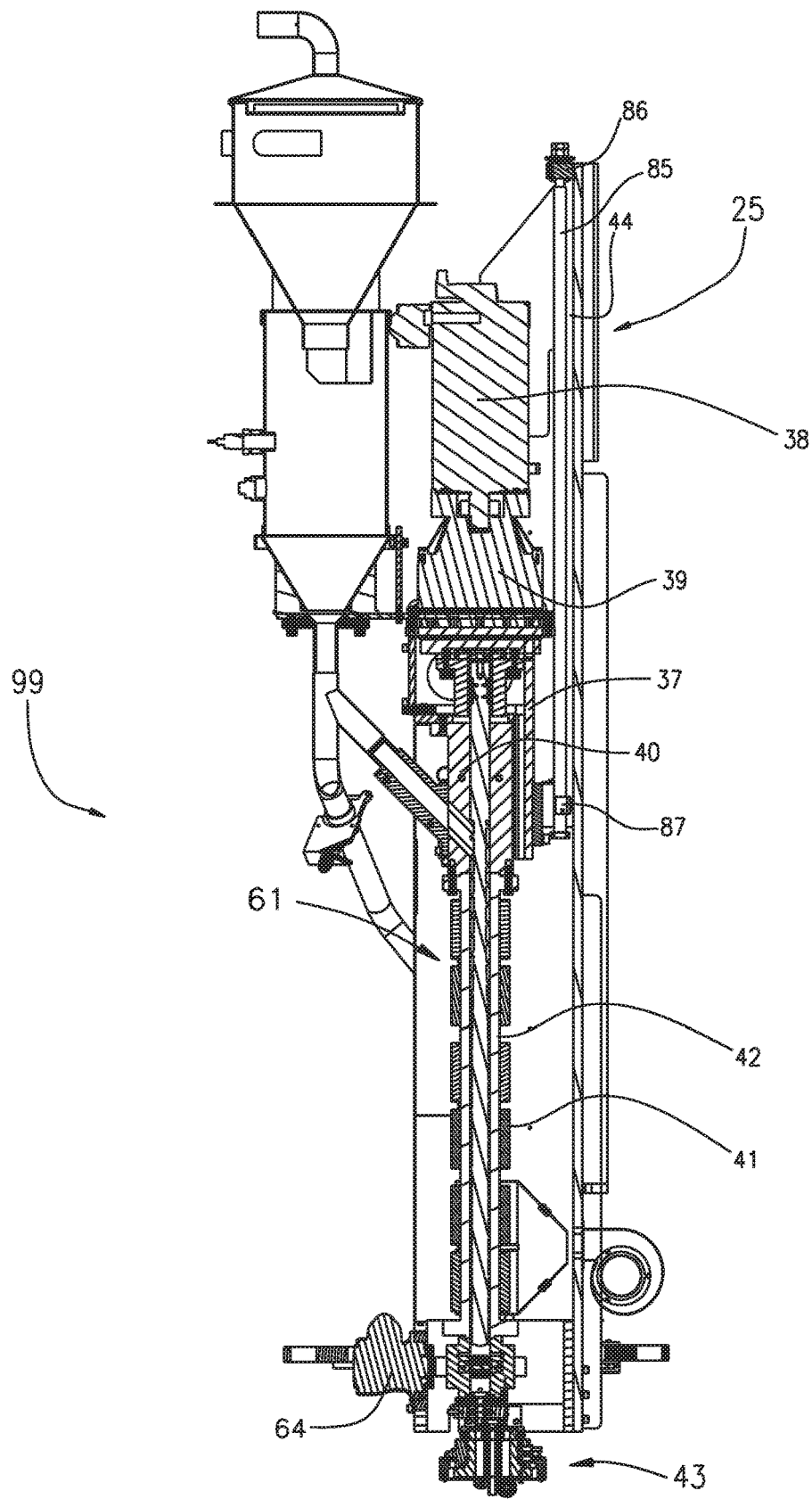
FIG. 6 is a cross-section view of an exemplary high output print head assembly of the exemplary CNC machine shown in FIG. 1 from a second side opposite to the first side at a position of a lead screw mechanism of the CNC machine.

As shown in FIG. 5, the gear pump 62 may be fixedly attached to the bottom of the carrier 25. The extruder 61, feed housing 40, transition housing 37, gearbox 39, and servomotor 38 may together form a group of components that expand as a unit. These expanding components, which may be referred to as an expansion unit or expansion assembly, may each be connected at positions above gear pump 62 along the z-axis, and may be configured to move (via expansion) vertically along linear rails (e.g., substantially trapezoidal rectangular, or cylindrical shafts) 44 and 45. One or more of the extruder 61, feed housing 40, transition housing 37, gearbox 39 or servomotor 38 may form an exemplary heated component that, when heated, is configured to move away from gear pump 62 and away from nozzle 51 in direction 80, for example. One or more bushings or linear bearings 50 may be provided on rails 44 and 45 and may be attached to a rear surface of transition housing 37. In one aspect, shafts 44 and 45 and linear bearings 50 may operate as guides to facilitate vertical motion of these components of print head 99. In this manner, as the length of the expansion assembly increases with a corresponding increase in temperature during operation of machine 1, a change in dimension may occur at the top of the expansion assembly. However, as the gear pump 62 may be fixed to the carrier 25, gear pump 62 and nozzle 51 may remain fixed at positions below the expansion assembly and are not affected by the expansion of the expansion assembly. This may provide the ability to maintain the vertical height of the print nozzle 51 approximately constant, as the expansion of the expansion assembly may not affect the position of gear pump 62 and nozzle 51. Additionally, as the expansion assembly increases in temperature, the components of the expansion assembly may grow in length, which may cause linear bearing 50 to gradually move up rails 44 and 45. At least a portion of extruder 61, for example, may be configured to move along rails 44 and 45 via sliding motion of linear bearings 50 along direction 80. In one aspect, nozzle 51 may acquire thermal expansion by a heat of thermoplastic material therein and may expand itself. The direction of the expansion of nozzle 51 may correspond to direction 82, which is approximately opposite to direction 80, as shown in FIG. 5.

The increase in temperature may include raising a temperature of extruder 61 from room temperature to an operating temperature (e.g., a temperature experienced by extruder 61 when material within the extruder 61 is melted). This temperature may be generated by at least a screw of extruder 61 and/or heaters 41. Gear pump 62 may receive this material while remaining at a fixed position relative to carrier 25 as pump 62 may be fastened directly to carrier 25. A length of extruder 61, as well as an overall length of the expansion assembly, may increase along direction 80 due to the expansion of the expansion assembly (including extruder 61) as the temperature of these components increases to an operating temperature. The operating temperature of each of the components of the expansion assembly may not necessarily be the same temperature.

Print head 99 may include a lead screw 85 as shown in FIGS. 2, 6, 8A, and 8B. Lead screw 85 may be a threaded screw, such as an acme screw, and may be configured to allow transition housing 37 and the other components of the expansion assembly to rise and descend on rails 44 and 45. In an alternate configuration, a ball screw may be employed in place of a lead screw. For example, lead screw 85 may be rotated by a servomotor (not shown) to raise and lower one or more components of the expansion assembly. In an exemplary configuration, the transition housing 37 may be raised or lowered to facilitate replacement of extruder screws and/or melt cores, for example, by separating transition housing 37 from extruder 61 and rotating lead screw 85. A nut 87 may be fixedly mounted to the back of the transition housing 37 to facilitate the motion of transition housing 37 along lead screw 85. When lead screw 85 is provided as an acme screw, nut 87 may be provided as an acme nut. Similarly, nut 87 may be formed as a ball nut when a ball screw is provided in place of a lead screw.

Figure 8A:
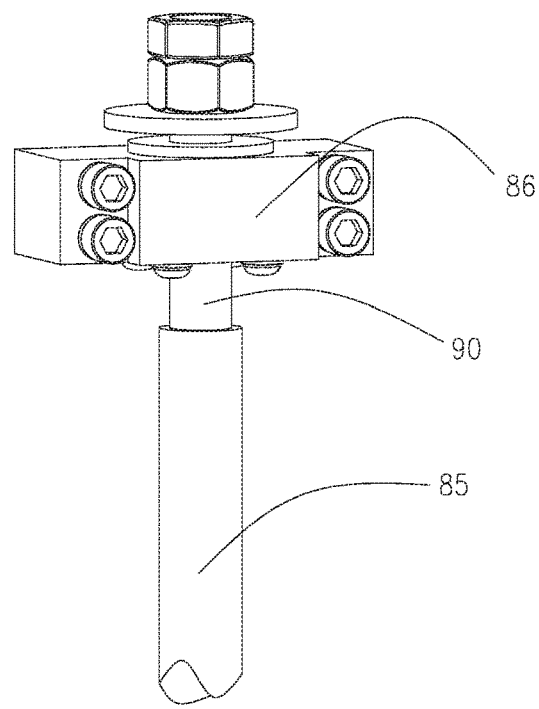
FIG. 8A is a perspective view of a machined lead screw device of the CNC machine at ambient temperature.
Figure 8B:
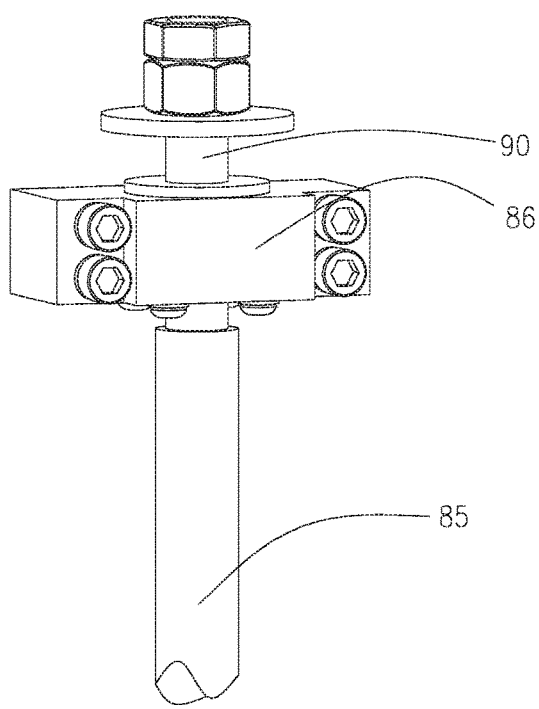
FIG. 8B is a perspective view of the machined lead screw device at an elevated temperature.

As best shown in FIGS. 8A and 8B, lead screw 85 may extend within a top support bearing 86 that may operate with lead screw 85 to compensate for the thermal expansion and contraction of the extruder 61 and other components. For example, a length (and/or diameter) of the screw 85 may be reduced by a predetermined amount. As illustrated in FIGS. 8A and 8B, a portion of screw 85 may have a diameter that is reduced in comparison to the remainder of screw 85 by a suitable machining process, such as turning, forming a machined portion 90. The reduction in the diameter, of screw 85 may allow the screw 85 to move vertically within, and with respect to, the top support bearing 86. In one aspect, portion 90 of lead screw 85 may be reduced in diameter such that expansion of the lead screw does not excessively constrict nut 87. For example, as shown in FIG. 8A, lead screw 85 may include machined portion 90 at an end portion thereof. This reduced diameter may be achieved, for example, by reducing a diameter of threading present on the lead screw 85. In one aspect, this threading, which may form an outer (maximum) diameter of lead screw 85, may be partially removed from lead screw 85 at machined portion 90. If desired, an entirety of the threading may be machined away in portion 90, resulting in a substantially uniform cylindrical surface. For clarity, individual threads are not shown in FIGS. 8A and 8B.

FIG. 8A illustrates an exemplary position of lead screw 85, including machined portion 90 extending through top support bearing 86, when CNC machine 1 is at an approximately ambient or room temperature environment (e.g., at a temperature of between about 65 and 85 degrees Celsius). As the extruder 61 and/or the other components of the expansion assembly generate and/or receive heat and expand, such expansion may cause lead screw 85 to move in an upward direction.

For example, the lead screw 85 may advance (expand vertically) from the exemplary position illustrated in FIG. 8A to the exemplary position shown in FIG. 8B. In one aspect, FIG. 8B may correspond to a maximum temperature of extruder 61 and the other components of CNC machine 1. During this motion, the lead screw 85, and, in particular, machined portion 90, may be configured to slide upward in the top support bearing 86 by an amount that is at least as large as an amount of motion caused by the thermal expansion. When the extruder 61 cools down and contracts, machined portion 90 of lead screw 85 may move in an opposite direction, sliding downward in the top support bearing 86. Support bearing 86 may permit vertical (linear) expansion and movement of lead screw 85, while providing radial support to screw 85. In one aspect, support bearing 86 may remain in a fixed position on carrier 25, while lead screw 85 moves with respect to both support bearing 86 and carrier 25. Therefore, the expansion assembly formed by extruder 61, feed housing 40, transition housing 37, gearbox 39, and servomotor 38, may grow and shrink in an approximately vertical direction due to the thermal expansion of its constituent components without being constricted by the lead screw mechanism.

To facilitate maintenance, such as replacement of an extruder screw within extruder 61, lead screw 85 may be manually rotated (e.g., in a clockwise direction), to lower screw 85 and cause the washer and nut(s) (as shown at the top of lead screw 85 in FIGS. 8A and 8B), to contact the top end of bearing 86. This action may be performed at ambient temperature, or at an elevated temperature, if desired. Lowering screw 85 in the manner, while transition housing 37 is separated from extruder 61, may increase the distance between transition housing 37 and extruder 61 (see FIG. 2) by moving extruder 61 downward. Moreover, transition housing 37, which may be slidably mounted on rails 44 and 45 (see FIG. 5), may be raised to further increase the distance between extruder 61 and transition housing 37 while extruder 61 remains secured via nut 87 (see FIG. 6). Transition housing 37 then may be rotated away from extruder 61, providing access to the top of extruder 61. Once maintenance is complete, lead screw 85 may be returned to the position shown in FIG. 8A.

As the position of nozzle 51 may be affected by the expansion of nozzle 51 itself, and not the expansion of the expansion assembly, it may be possible to compensate for the thermal expansion of the nozzle 51 by using different lengths of nozzles tips for different materials having different melting points. FIG. 7 shows two exemplary nozzles 51A and 51B that may be employed as nozzle 51. A first nozzle 51A may be configured for use with a lower temperature material. A second nozzle 51B may be configured for use with a material that is used at a higher temperature (e.g., has a higher melting point) as compared to the first material. Thus, second nozzle 51B may have a slightly shorter nozzle tip as compared to first nozzle 51A to account for the increased thermal expansion that second nozzle 51B may experience. Nozzle 51B may include a groove or any other suitable feature to facilitate identification between nozzle 51A, for example. Thus, nozzles 51A and 51B may be readily differentiated, and may have a marking, such as a groove, associated with a particular temperature and/or a particular material. For example, nozzle 51A may be associated with a first thermoplastic material having a first melting point, while nozzle 51B may be associated with a second thermoplastic material having a second melting point that is larger than the first melting point. The groove, or other identification, on nozzle 51B, may be associated with the second thermoplastic material and/or the second melting point. Additionally, the use of a groove may facilitate identification of a nozzle 51A, 51B, that is currently installed in applicator head 43. Thus, the exemplary groove may allow identification of nozzle 51B without the need to employ a measurement device.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited by the appended claims.

What is claimed is:

1. An additive manufacturing apparatus, comprising:
   an extruder connected to a carrier and movable with respect to the carrier;
   a gear pump in fluid communication with the extruder, the gear pump supported on the additive manufacturing apparatus with the extruder;
   a rail extending along the carrier;
   a linear motion assembly including a lead screw extending along the carrier and adjacent to the rail, the lead screw including an end portion having a reduced diameter as compared to an inward portion of the lead screw; and
   a nozzle in fluid communication with the gear pump, wherein the extruder is movably connected to the rail such that at least a portion of the extruder is configured to expand and move with respect to the rail in accordance with a thermal expansion of the extruder,
wherein the gear pump is fixed to the carrier so as to remain at a fixed position with respect to the carrier.

2. The additive manufacturing apparatus of claim 1, wherein the extruder is configured to move along the rail in a direction away from the gear pump.

3. The additive manufacturing apparatus of claim 1, further including a bearing connected to the rail and connected to the extruder.

4. The additive manufacturing apparatus of claim 1, wherein the extruder is configured to increase in length in a first direction away from the gear pump due to thermal expansion of the extruder.

5. The additive manufacturing apparatus of claim 4, wherein the nozzle is configured to increase in length in a second direction due to thermal expansion of the nozzle.

6. The additive manufacturing apparatus of claim 5, wherein the second direction is approximately opposite to the first direction.

7. The additive manufacturing apparatus of claim 1, further including a housing connected to the extruder, the housing also being connected to the linear motion assembly.

8. The additive manufacturing apparatus of claim 7, wherein the linear motion assembly includes a nut, the nut being secured to the housing.

9. The additive manufacturing apparatus of claim 7, wherein the housing is at least partly supported by a bearing slidably connected to the rail.

10. The additive manufacturing apparatus of claim 7, wherein the rail is fixed to a plate of a member of the carrier on which the extruder and the gear pump are supported.

11. An additive manufacturing system including the additive manufacturing apparatus of claim 1 and a plurality of nozzles having different lengths.

12. An additive manufacturing apparatus, comprising:
an extruder supported on a support member and movable with respect to the support member;
a gear pump fluidly coupled to the extruder;
a guide rail extending along the support member;
a linear motion assembly configured to raise and lower the extruder, the linear motion assembly including a screw extending along the support member adjacent to the guide rail, the screw including an end portion sized to move axially within a support bearing of the linear motion assembly; and
a nozzle in fluid communication with the gear pump and movable along an x-axis, a y-axis, and a z-axis to deposit a bead of thermoplastic material, wherein the extruder is connected to the linear motion assembly on the support member configured to raise and lower the extruder along the z-axis,
wherein the gear pump is fixed to the support member so as to remain at a fixed position with respect to the support member.

13. The additive manufacturing apparatus of claim 12, wherein the guide rail is mounted to the support member.

14. The additive manufacturing apparatus of claim 13, wherein the extruder is movably mounted to the guide rail.

15. The additive manufacturing apparatus of claim 1, further including a pair of rails, wherein the lead screw is positioned so as to extend between the pair of rails.

16. The additive manufacturing apparatus of claim 13, further including a pair of guide rails, wherein the screw is positioned so as to extend between the pair of guide rails.

* * * * *